Figure 7:
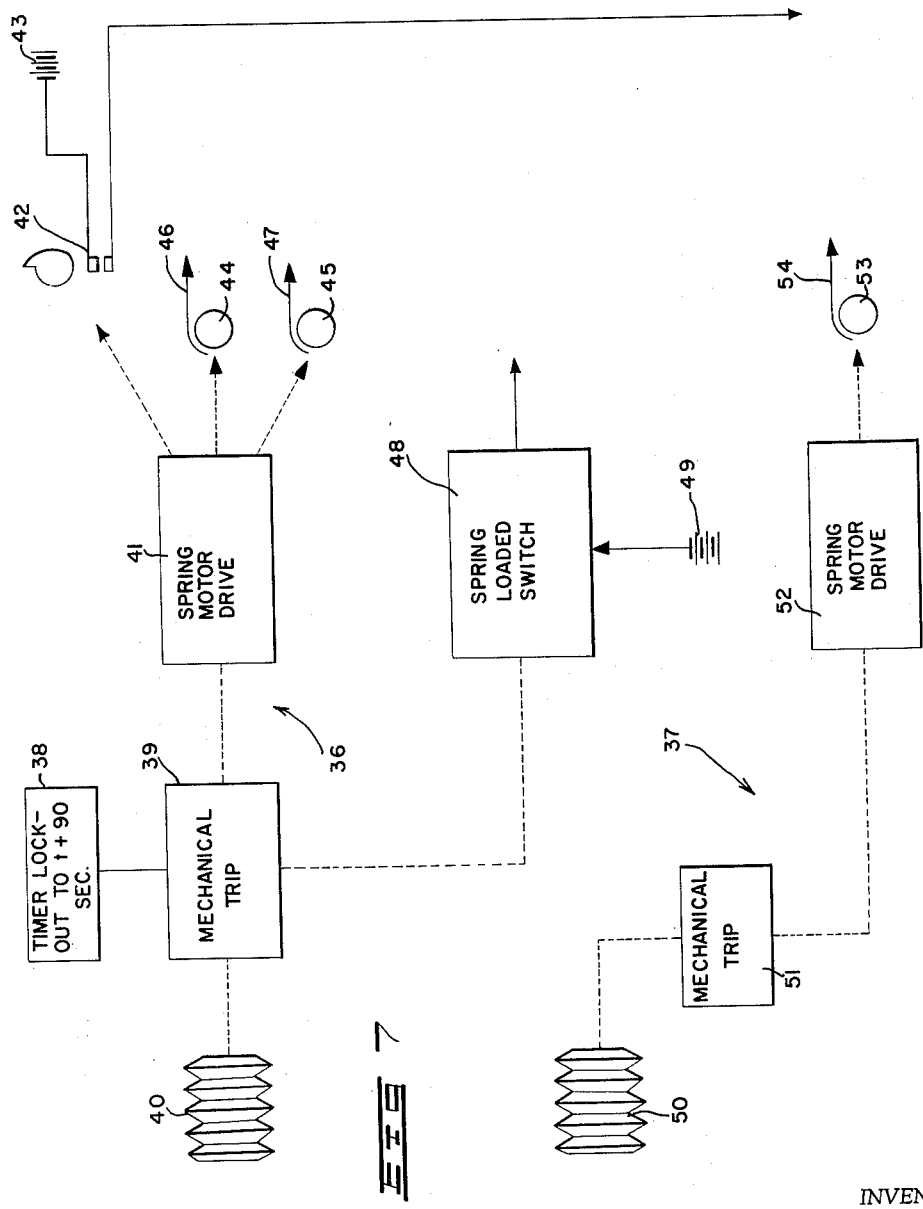

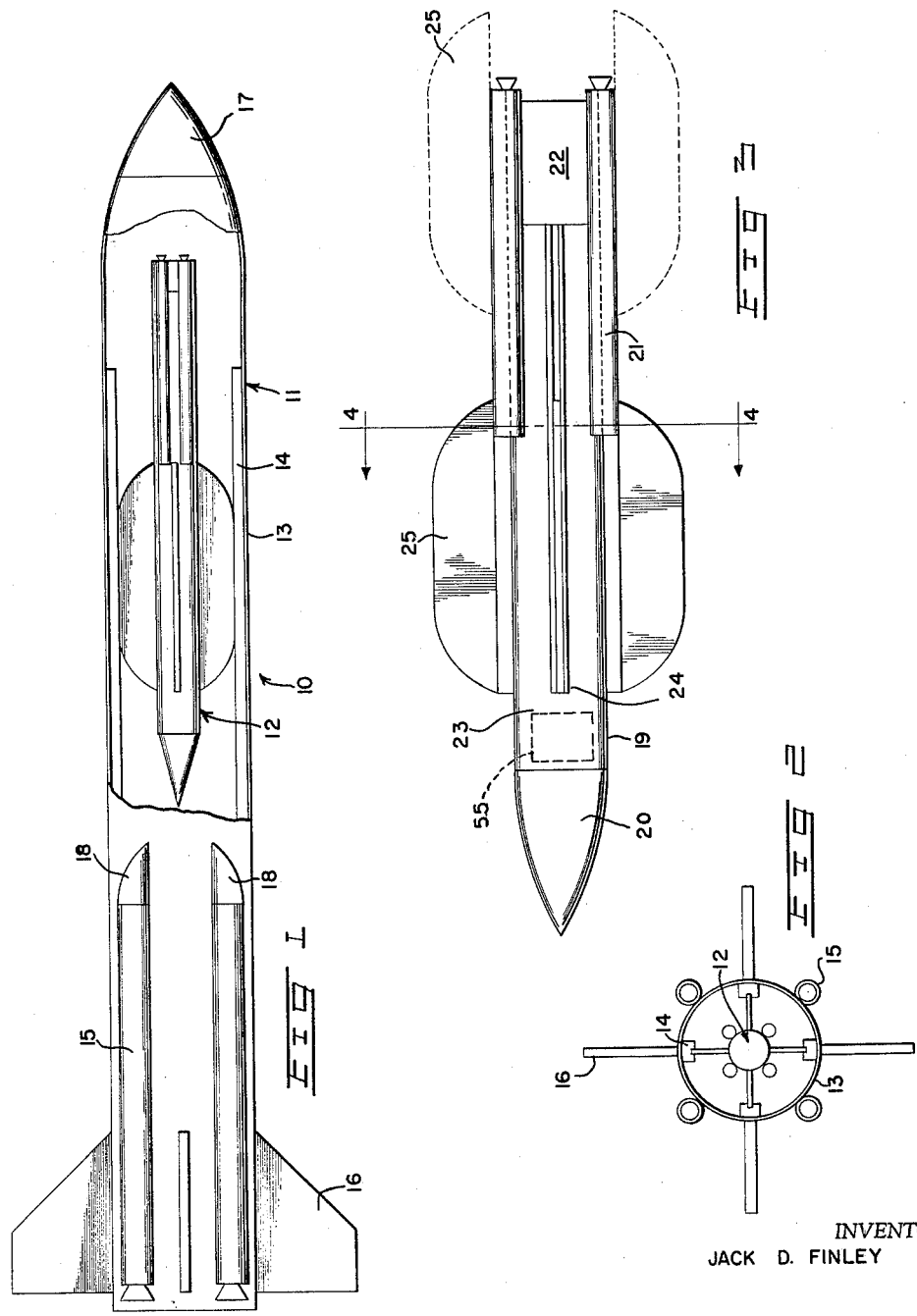

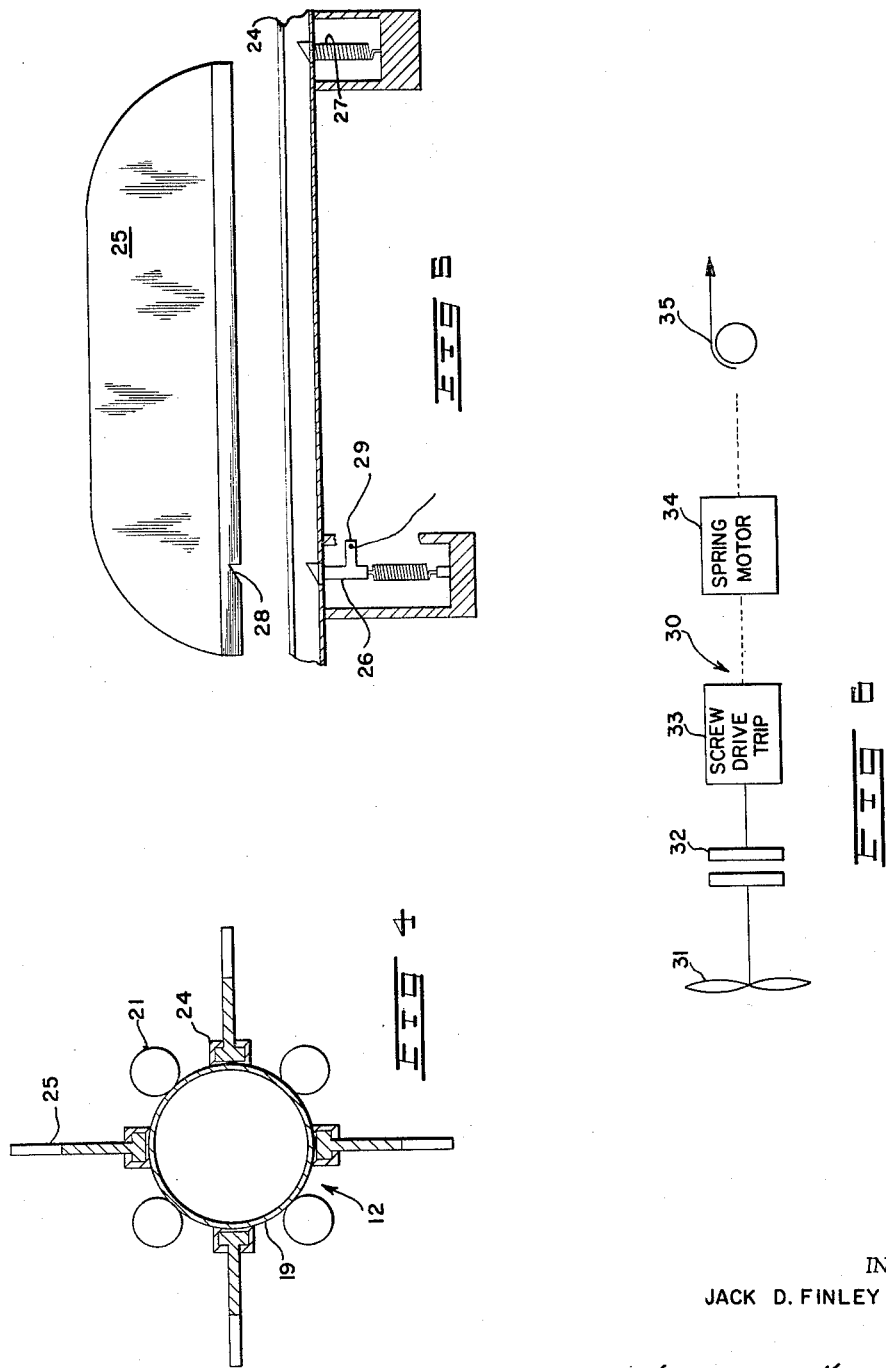

Nov. 24, 1964  J. D. FINLEY  3,158,100
ROCKET PROPELLED RECONNAISSANCE VEHICLE
Original Filed July 22, 1960  3 Sheets-Sheet 3

INVENTOR
JACK D. FINLEY

BY *Harmon & Kurz*
ATTORNEY

United States Patent Office 3,158,100
Patented Nov. 24, 1964

3,158,100
ROCKET PROPELLED RECONNAISSANCE
VEHICLE
Jack D. Finley, Dayton, Ohio, assignor, by mesne assignments, to Data Corporation, Dayton, Ohio, a corporation of Ohio
Continuation of application Ser. No. 44,613, July 22, 1960. This application Mar. 4, 1963, Ser. No. 263,381
17 Claims. (Cl. 102—49)

This invention relates to aerial reconnaissance vehicles generally and more particularly to an improved rocket propelled reconnaissance vehicle for gathering aerial intelligence information. As disclosed herein, the invention constitutes a continuation of my co-pending application entitled Rocket Propelled Reconnaissance Vehicle, Serial No. 44,613, filed July 22, 1960.

In all phases of military operations, it is imperative that accurate information be obtained relative to conditions within an enemy territory by reconnaissance techniques. These reconnaissance techniques include military ground and sea reconnaissance, battle field surveillance, weather data collection, boundary penetration, collection of data during penetration of atomic clouds, and many other analogous areas where remote intelligence gathering is desired.

Present reconnaissance techniques include the use of aerial dynamic vehicles of the piloted variety and also pilotless aircraft or drones. These vehicles are not amenable to rapid and simple deployment and are not suitable for prolonged high altitude operation. Also such vehicles require a degree of support which is unacceptable for many applications.

The piloted reconnaissance aircraft presently in use usually consist of high speed, unarmed aircraft, and an extreme degree of risk is experienced by the crew of such aircraft while gathering information over enemy targets.

The drone or pilotless aircraft, which are often utilized to replace the piloted reconnaissance aircraft, are equipped with control systems, guidance equipment, and aerial dynamic controls which are used to provide a controlled turn-about at the target and a controlled flight back to a desired point within friendly territory. The guidance equiment necessary to perform a control turn over target and a return flight to a friendly base is extremely expensive to build and is very complex in nature and therefore subject to a large degree of malfunction.

The primary object of this invention is to provide a rocket propelled reconnaissance vehicle capable of returning a payload from a pre-selected target area along a ballistic trajectory.

Another object of this invention is to provide a rocket propelled reconnaissance vehicle capable of returning a payload from a pre-selected target area along a ballistic trajectory by means of a rearward firing rocket propelled recovery vehicle.

A further object of this invention is to provide a rocket propelled reconnaissance vehicle of the two stage variety which includes a rearwardly firing rocket propelled recovery vehicle capable of being launched from within a primary delivery stage vehicle over a target area.

Another object of this invention is to provide a rocket propelled reconnaissance vehicle which may be launched from the ground, from ground vehicles, from aircraft, or from ships and submarines.

A further object of this invention is to provide a rocket propelled reconnaissance vehicle of economic size and weight with resulting freedom of movement and speed of deployment.

A still further object of this invention is to provide a rocket propelled reconnaissance vehicle of simple design which may be economically produced for use in high altitude reconnaissance.

With the foregoing and other objects in view, the invention resides in the following specification and appended claims, certain embodiments and details of construction of which are illustrated in the accompanying drawings in which:

FIGURE 1 is a cut-away view in side elevation of the invention illustrating the relationship of the delivery and recovery stages, FIGURE 2 is an end view illustrating the aft portion of the invention of FIGURE 1, FIGURE 3 is a sectional view in side elevation showing the recovery stage of the invention of FIGURE 1, FIGURE 4 is an end view illustrating the aft portion of the recovery stage of FIGURE 3, FIGURE 5 is an exploded view illustrating the fin locking mechanism of the recovery stage of FIGURE 3, FIGURE 6 is a diagrammatic layout illustrating the activating mechanism for the fin locking mechanism of FIGURE 5; and FIGURE 7 is a block diagram showing the control system for the invention of FIGURE 1.

Basically, the rocket propelled reconnaissance vehicle of the present invention includes a two-stage rocket propelled vehicle consisting of a delivery stage missile and a recovery stage missile. The recovery stage missile is contained within the delivery stage missile, and is carried along a ballistic trajectory to a target by the delivery stage. When a pre-selected target area is reached, intelligence information is gathered by equipment within the recovery stage and the recovery stage missile is then rearwardly launched from within the delivery stage and returns over a ballistic trajectory to the original launching area. The rocket motors utilized for the propulsion of each stage of the reconnaissance vehicle are conventional solid propulsion motors with sufficient total impulse to allow the vehicle stages to arrive over and return from the pre-selected target area. The delivery and recovery stages include high fineness ratio rockets and the propellant fraction is the variable range control for the individual rocket stages, although other active control means could be utilized for the improvement of targeting.

Launching of the reconnaissance vehicle is to be accomplished from a rail launcher, and targeting can be computed by the use of tables similar to the conventional artillery data used for the targeting of guns, and from local meteorological data. The variables at the launcher will be the azimuth and elevation of the launcher, and the wind and target information may be translated into these two variables by reference to appropriate tables. Thus, it may be seen that the present reconnaissance vehicle may be launched as a purely ballistic missile without the requirement of expensive electronic control guidance mechanisms.

Referring to FIGURE 1, the rocket propelled reconnaissance vehicle indicated generally at 10 includes a delivery stage 11 which carries a recovery stage 12. The delivery stage 11 includes a body section 13 which is substantially in the form of an open cylinder. Body 13 is equipped with four peripherally spaced U-shaped slides 14 extending longitudinally along the inner wall thereof. Mounted externally about the aft portion of the cylindrical body 13 are propulsion rocket engines 15 and stabilizing fins 16 (FIGURE 2). The rocket engines 15 for the delivery stage 11 are externally mounted in order to afford a clear internal passageway through the cylindrical body 13. The forward end of the cylindrical body 13 is provided with an aerodynamic cap 17 which protects the payload within the delivery stage 11 and provides a method for reducing aerodynamic drag during the delivery flight. Arranged within the body 13 of the delivery stage 11 are a number of compartments 18 which contain a sequencing control mechanism for activating the various phases of operation of the reconnaissance vehicle 10. These compartments are few in number and the components contained within each compartment are expendable. The compartments 18 are arranged so as not to interfere with the launching of the recovery stage 12.

Referring to FIGURES 3 and 4, it will be noted that the recovery stage 12 is similar in external configuration to the delivery stage 11. The recovery stage includes a cylindrical body 19 which is dimensioned to fit inside the open cylindrical body 13 of the delivery stage 11. The forward or nose portion of the body 19 is provided with a jettisonable aerodynamic bearing or cap 20 which provides a compartment 55 for a recovery parachute, here shown in dotted lines. Rocket motors 21 are mounted externally of the aft portion of the body 19 to allow for the installation of a payload chamber 22 in the internal tail portion of the recovery stage 12. Any desired intelligence sensor for providing the required reconnaissance information may be mounted within the payload chamber 22. The central portion of the body 19 is provided with a mechanism compartment 23 where the control mechanism for the recovery stage is mounted.

Extending longitudinally along the external portion of the body 19 of the return stage 12 are four T-shaped slides 24 which mount laterally projecting stabilizing fins 25. The recovery stage 12 is mounted within the delivery stage 11 by inserting the fins 25 in the U-shaped slides 14 so that the U-shaped slides may act as a launching ramp for the recovery stage. The recovery stage 12 is inserted into the delivery stage 11 with the aerodynamic cap 20 toward the tail section of the delivery stage, since the ejection and the return of the recovery stage is to be in this direction. As the recovery stage 12 is to be fired in a rearward direction with respect to the initial direction of the travel through the air mass, means must be provided for stabilizing the recovery stage. This is accomplished by physically moving the fins 25 in the slides 24 to a position near the aerodynamic cap 20 prior to the installation of the recovery stage within the delivery stage. When the recovery stage 12 is launched, the position of the fins 25 will determine the position of the center of pressure. The center of pressure will be toward the aerodynamic cap 20 with respect to the center of gravity when the recovery stage is so situated that the ambient airflow is toward the payload. At a predetermined period of time after firing when the thrust of the rockets 21 has diminished the air speed to zero in the direction taken by the delivery stage 11, and a positive air speed has been attained in the direction of the return trip, the fins 25 will be moved rearwardly in the slides 24 as shown in FIGURE 3, so that the center of pressure will be shifted to a position behind the center of gravity with respect to the direction of travel, and the missile will thus be stable.

Referring now to FIGURES 5 and 6, the afore-described movement of the fins 25 within the slides 24 is controlled by spring pressed locks 26 and 27. The locks 26 and 27 are situated within the slides 24 and cooperate with a notch 28 which is provided in the lower surface of the fin 25. When a fin 25 is in the forward or firing position, the lock 26 is engaged within the notch 28 to securely hold the fin in this position. At the proper time after the firing of the return stage 12, the lock 26 is retracted by means of a lanyard unlocking mechanism 29, and fin 25 is forced rearwardly in the slide 24 by inertia and aerodynamic drag until the lock 27 engages in the slot 28. The lock 27 is designed to offer virtually no resistance to fin 25 as it passes along the body 19 in a rearward direction. Once the lock 27 is engaged in the slot 28, high resistance is offered to any attempt by fin 25 to proceed in a forward direction.

The lanyard unlocking mechanism 29 for the forward lock 26 is operated by means of a mechanical control unit 30 illustrated in FIGURE 6. It is obvious that any suitable control unit which would act to release the forward lock 26 at a set time after the firing of the return stage 12 when the return stage had reached a predetermined positive air speed could be utilized. The control mechanism 30 of FIGURE 6 includes an air speed sensing propeller 31 which drives a one way clutch 32. Clutch 32 is only sensitive to the direction of turn of the propeller 31 which indicates travel through the air in the direction of the aerodynamic cap 20. The clutch 32 drives a screw drive trip mechanism 33 to cause the trip mechanism to release a spring motor 34. Spring motor 34 winds up a lanyard pull unit 35 which in turn unlocks the forward fin lock 26.

The control system and operation of the two stage rocket propelled reconnaissance vehicle of the present invention may be best understood by referring to FIGURE 7 which provides an illustration of a mechanical control unit 36 for the delivery stage 11 and a mechanical control unit 37 for the recovery stage 12. Upon the launching of the reconnaissance vehicle 10, a lock-out timer 38 is activated. The timer 38 may be any timing unit of common mechanical design which may be set to activate a mechanical trip 39, which has been previously locked out by the timer, a short time, for example approximately 90 seconds, after the launching. The delivery stage 12 will continue along a ballistic trajectory until it begins a descent in the vicinity of the target area. When the delivery stage descends to a predetermined altitude, which will be designated as $h1$, a baro bellows 40 will sense the altitude $h1$ and trigger the mechanical trip 39 to allow it to release a spring motor drive 41. The spring motor drive 41 is coupled by suitable mechanical or electrical means to a cam actuated switch 42 which, when activated by the spring motor 41, locks in the closed position. This switch 42 is electrically connected to a battery 43 and also to the reconnaissance equipment power input in the payload chamber 22 of the return stage 12. Activation of the switch 42 causes power to be provided to the reconnaissance equipment in the payload chamber 22, so that the equipment may begin to gather target information. The spring motor drive 41 is also mechanically coupled to a pair of lanyard pull mechanisms 44 and 45, which consist of drums designed to wind up lanyard cables 46 and 47. The lanyard pull 44 is coupled to the release mechanism of the aerodynamic cap 17 on the delivery stage 12, and the tensioning of the lanyard 46 retracts a locking pin, such as lock 26 shown in FIG. 5; permitting the cap 17 to be ejected by the dynamic air pressure ambient at the cap. The rotation of the lanyard pull 45 causes the lanyard 47 to free the recovery stage 12 in the slides 14, so that the recovery stage is free to eject from the cylindrical body 13 of the delivery stage 11. When the vehicle 10 has reached some lower altitude designated at $h2$, the mechanical trip 39 under the control of the bellows 40 will activate a spring loaded switch 48 which connects a battery 49 to igniters carried by the rockets 21 of the recovery stage 12. At this point the rockets of the recovery stage fire, causing the stage to leave the delivery stage and proceed in a direction opposite to the direction of travel of the delivery stage. The recovery stage 12 will be stabilized by the stabilizing fins 25 in the manner previously described, and will continue on a return ballistic trajectory toward the original launching site until it begins a descent over the launching site. When the recovery stage descends to an altitude designated at $h3$, which is small in comparison to the previous altitudes, $h1$ and $h2$, the controlling mechanism 37 within the recovery stage 12 will be actuated by a baro bellows 50. Baro bellows 50 operates a mechanical trip 51 which in turn releases a spring motor drive 52. Spring motor drive 52 drives a lanyard pull 53 to tension a lanyard 54 which is attached to the release mechanism of the aerodynamic cap 20 of the recovery stage 12. Tensioning of the lanyard 54 will retract a locking pin, such as lock 26 shown in FIG. 5 causing the jettisoning of the aerodynamic cap 20 and allowing a recovery parachute to be ejected to one side to lower the stage with the payload to the ground.

In some instances it might be desirable to decrease the speed of the reconnaissance vehicle 10 prior to the firing of the recovery stage 12. This may be done when the vehicle 10 reaches the altitude h1 by techniques similar to those employed for this purpose in other aerial vehicles. The first method may be by the use of drag modulation in which the effective drag of the vehicle is increased by the extension of dive brakes activated from the spring motor 41. The second method would be by the firing of retro-rockets carried externally of the vehicle by means of the switch 42. Either method is feasible and has been successfully employed for other aerial purposes.

It will be readily apparent to those skilled in the art that the present invention provides a novel two-stage rocket propelled reconnaissance vehicle which is designed to deliver an intelligence gathering payload to a point in space over a pre-selected target area and to return the payload to an original launching area. The arrangement and types of components utilized within this invention may be subject to numerous modifications well within the purview of this inventor who intends only to be limited to a liberal interpretation of the specification and appended claims.

I claim:

1. An aerial reconnaissance vehicle for gathering information over a designated target area and returning said information to the area of an initial launching site, comprising, a delivery stage rocket including a hollow body section, a nose section, and a tail section, mounting means secured within said hollow body section, a recovery stage rocket having a nose section and a tail section, said recovery stage rocket being reversely mounted within said hollow body section by said mounting means, whereby the nose section of said recovery stage rocket is positioned adjacent the tail section of said delivery stage rocket, information gathering means carried by said recovery stage rocket, altitude responsive control means carried by said vehicle for activating said information gathering means when the vehicle reaches a predetermined first altitude over said target area, and altitude responsive launching control means mounted within said vehicle to cause the launching of said recovery stage rocket from the tail section of said delivery stage rocket subsequent to the activation of said information gathering means when said vehicle reaches a second predetermined altitude over said target area, said recovery stage rocket being capable of returning said information gathering means to the area of said initial launching site upon detachment from said delivery stage rocket.

2. The aerial reconnaissance vehicle of claim 1 wherein said altitude responsive control means for said information gathering means includes an altitude sensing means constructed to operate at a predetermined altitude, motor means connected to be actuated upon the operation of said altitude sensing means, a power source coupled to provide power to said information gathering means, and switch means connected between said power source and said information gathering means to selectively control the provision of power to said information gathering means, said switch means being connected to said motor means, whereby said switch is actuated to provide power to said reconnaissance means upon the actuation of said motor means.

3. The aerial reconnaissance vehicle of claim 2 wherein said altitude responsive launching control means includes means connected to be operated by the altitude responsive control means for said information gathering means to free said second stage rocket for launching within said mounting means, a second altitude sensing means constructed to operate at a second predetermined altitude, and means controlled by said second altitude sensing means to connect said power supply to said second stage rocket, whereby said second stage rocket is furnished with power to initiate the launching thereof from within said first stage rocket.

4. An aerial reconnaissance vehicle for gathering information over a designated target area and returning said information to the target area of an initial launching site, comprising, a delivery stage rocket including a hollow body section, a nose section, and a tail section, mounting means secured within said hollow body section, a recovery stage rocket having a nose section and a tail section reversely mounted within said hollow body section by said mounting means, whereby the nose section of said recovery stage rocket is positioned adjacent the tail section of said delivery stage rocket, said recovery stage rocket including laterally extending stabilizing means capable of longitudinal movement along the body of said recovery stage rocket from a forward locking position to a rearward locking position, and stabilization control means carried by said recovery stage rocket to initiate the longitudinal movement of said stabilizing means, information gathering means mounted within said recovery stage rocket, altitude responsive control means mounted within said vehicle for activating said information gathering means when the vehicle reaches a first predetermined altitude over a target area, and altitude responsive launching control means mounted within said vehicle to cause the launching of said recovery stage rocket from the tail section of said delivery stage rocket when the vehicle reaches a second predetermined altitude over said target area, said recovery stage rocket being capable of returning said information gathering means to the area of said initial launching site upon detachment from said delivery stage rocket.

5. The aerial reconnaissance vehicle of claim 4 in which said stabilization control means for said longitudinally moving stabilizing means includes locking means to selectively lock said stabilizing means in either a forward or a rearward locking position along the body of said recovery stage rocket, air speed responsive means adapted to become operable when said recovery stage rocket reaches a predetermined forward air speed after the launching from said delivery stage rocket, motor means coupled to said air speed responsive means to be activated thereby, a lock actuation means connected between said motor means and said locking means, said lock actuation means being actuated by said motor means to release said stabilizing means for longitudinal movement along the body of said recovery stage rocket, the movement of said stabilizing means acting to shift the center of pressure of said recovery stage rocket to cause flight stabilization thereof after detachment from said delivery stage rocket.

6. An aerial reconnaissance vehicle for gathering information over a designated target area and returning said information to the area of an initial launching site, comprising, a delivery stage rocket including a nose section and a tail section, a recovery stage rocket reversely mounted within said delivery stage rocket, information gathering means carried by said recovery stage rocket, means carried by said vehicle for activating said information gathering means when the vehicle reaches a predetermined position over said target area, launching control means mounted within said vehicle to cause the launching of said recovery stage rocket from the tail section of said delivery stage rocket subsequent to the activation of said information gathering means, variable stabilizing means including laterally extending fin members mounted exteriorly of said recovery stage rocket and capable of longitudinal movement from a forward to a rearward locking position along the body of said recovery stage rocket, and air speed responsive control means carried by said recovery stage rocket, said control means being responsive to the positive air speed of said recovery stage rocket subsequent to the detachment thereof from said delivery stage rocket and operatively connected to said stabilizing fin members to initiate the longitudinal movement of said stabilizing fin members from the forward to the rearward locking position to cause the center of pressure to be shifted to a position beyond the center of gravity of said recovery stage rocket in flight.

7. An aerodynamic reconnaissance vehicle for gathering information over a designated target area and returning said information to the area of an initial launching site, comprising, a delivery stage rocket including a hollow body section, an aerodynamic cap mounted upon one end of said body section, stabilizing fins and rocket propulsion means mounted externally at the opposite end of said body section, and a plurality of peripherally spaced slide units extending longitudinally along the inner surfaces of said body section, a recovery stage rocket having a jettisonable aerodynamic cap mounted upon one end thereof and stabilizing fins and rocket propulsion means mounted externally at the opposite end thereof, said recovery stage rocket being reversely mounted within the body of said delivery stage rocket with the aerodynamic cap thereof adjacent the stabilizing fins of said delivery stage rocket by the insertion of the stabilizing fins of said recovery stage rocket into the peripherally spaced slide units within said recovery stage rocket, information gathering means carried by said recovery stage rocket, pressure sensitive control means mounted within said vehicle to initiate the activation of said information gathering means when said vehicle reaches a predetermined altitude above the target area, and launching control means carried by said vehicle to automatically launch said recovery stage rocket subsequent to the activation of said information gathering means when the vehicle drops to a second predetermined altitude above said target area, whereby said recovery stage rocket is caused to proceed back over the general course followed by the delivery stage rocket from the initial launching site.

8. An aerial reconnaissance vehicle for gathering information over a designated target area and returning said information to the area of an initial launching site, comprising, a delivery stage rocket including a nose section and rocket propulsion means, a recovery stage rocket including a nose section incorporated within the body of said delivery stage rocket and detachably secured to said delivery stage rocket so as to be reversely mounted relative to the direction of travel of said delivery stage rocket, whereby the nose section of said recovery stage rocket is reversely positioned relative to the nose section of said delivery stage rocket, said recovery stage rocket having rocket propulsion means and laterally extending fin members secured thereto, said fin members being mounted exteriorly of said recovery stage rocket and being capable of longitudinal movement along the body thereof, information gathering means carried by said recovery stage rocket, first control means carried by said vehicle, said first control means operating to initiate the information gathering cycle of said information gathering means and to cause the ejection of the nose section of said delivery stage rocket at a first point over said target area, second control means carried by said vehicle, said second control means constituting altitude responsive control means operable at a predetermined altitude and subsequent to the operation of said first control means to activate the rocket propulsion means of said recovery stage rocket, said recovery stage rocket propulsion means operating to cause said recovery stage rocket to travel along a path substantially opposite to that followed by said delivery stage rocket, recovery means carried by said recovery stage rocket, said recovery means operative to reduce the speed of said recovery stage rocket to facilitate the delivery of said information gathering means to the area of the initial launching site, and altitude responsive control means carried by said recovery stage rocket, said altitude responsive control means operative at a predetermined altitude over said initial launching site to activate said recovery means.

9. A two-stage rocket aerial reconnaissance vehicle for gathering information over a designated target area and returning said information to the area of an initial launching site, comprising, a vehicle body having a nose section and a tail section, solid state rocket propulsion means secured to said body, a recovery stage rocket including a nose section incorporated within the body of said reconnaissance vehicle and detachably secured to said reconnaissance vehicle so as to be reversely mounted relative to the direction of travel of said vehicle, whereby the nose section of said recovery stage rocket is reversely positioned relative to the nose section of said reconnaissance vehicle, said recovery stage rocket having solid state rocket propulsion means and laterally extending fin members secured thereto, said fin members being mounted exteriorly of said recovery stage rocket and capable of longitudinal movement along the body thereof, means mounted upon said vehicle to produce a reverse thrust in a direction opposite the direction of travel of said vehicle, programmed control means including altitude responsive control means carried by said vehicle, said programmed control means operating over the target area to sequentially cause the ejection of the nose section of said reconnaissance vehicle, initiation of the information gathering cycle of said information gathering means, actuation of said reverse thrust producing means, and launching of said recovery stage rocket along a path substantially opposite to that followed by said reconnaissance vehicle, recovery means carried by said recovery stage rocket, said recovery means operative to reduce the speed of said recovery stage rocket to facilitate the delivery of said information gathering means to the area of the initial launching site, and altitude responsive control means carried by said recovery stage rocket, said altitude responsive control means operative at a predetermined altitude over said initial launching site to activate said recovery means.

10. A two-stage rocket aerial reconnaissance vehicle for gathering information over a designated target area and returning said information to the area of an initial launching site, comprising, a delivery stage rocket including a nose section and rocket propulsion means, a recovery stage rocket detachably secured to said delivery stage rocket so as to be reversely mounted relative to the direction of travel of said delivery stage rocket, the forward portion of said recovery stage rocket being reversely positioned relative to the nose section of said delivery stage rocket, rocket propulsion means mounted upon said recovery stage rocket, first control means carried by said vehicle, said first control means operating to initiate the information gathering cycle of said information gathering means, second control means carried by said vehicle, said second control means constituting altitude responsive control means operative at a predetermined altitude subsequent to the operation of said first control means to activate the rocket propulsion means of said recovery stage rocket, said recovery stage rocket propulsion means operating to cause said recovery stage rocket to travel along a path substantially opposite that followed by said delivery stage rocket, recovery means carried by said recovery stage rocket, said recovery means operative to reduce the speed of said recovery stage rocket to facilitate the delivery of said information gathering means to the area of the initial launching site, and control means carried by said recovery stage rocket, said control means operative at a predetermined point over said initial launching site to activate said recovery means.

11. An aerial reconnaissance vehicle for gathering information over a designated target area and returning said information to the area of an initial launching site, comprising a delivery stage rocket including a nose section and rocket propulsion means, a recovery stage rocket detachably secured to said delivery stage missile so as to be reversely mounted relative to the direction of travel of the said delivery stage rocket, the forward section of said recovery stage rocket being reversely positioned relative to the nose section of said delivery stage rocket, rocket propulsion means secured to said recovery stage rocket, information gathering means carried by said recovery stage rocket, means to provide a reverse thrust secured to said recovery stage rocket, said reverse thrust means operating to provide a thrust in a direction opposite to the direction of travel followed by said delivery stage rocket, programmed control means carried by said vehicle, said programmed control means operating over said target area to activate said reverse thrust producing means and initiate the launching of said recovery stage rocket along a path substantially opposite to that followed by said delivery stage rocket, recovery means carried by said recovery stage rocket, said recovery means operative to reduce the speed of said recovery stage rocket to facilitate the delivery of said information gathering means to the area of the initial launching site, and recovery control means carried by said recovery stage rocket, said recovery control means operative over said initial launching site to actuate said recovery means.

12. An aerial reconnaissance vehicle for gathering information over a designated target area and returning said information to the area of an initial launching site, comprising, a delivery stage rocket, a recovery stage missile detachably secured to said delivery stage rocket so as to be reversely mounted relative to the direction of travel of said delivery stage rocket, information gathering means carried by said recovery stage rocket, control means carried by said vehicle for automatically launching said recovery stage rocket over said target area to cause said recovery stage rocket to travel along a path substantially opposite to that followed by said delivery stage rocket, recovery means carried by said recovery stage rocket, said recovery means operative to reduce the speed of said recovery stage rocket to facilitate the delivery of said information gathering means to the area of the initial launching site, and recovery control means carried by said recovery stage rocket, said recovery control means operative over said initial launching site to activate said recovery means.

13. An aerial reconnaissance vehicle for gathering information over a designated target area and returning said information to the area of an initial launching site, comprising, a delivery stage rocket, a recovery stage missile detachably secured to said delivery stage rocket so as to be reversely mounted relative to the direction of travel of said delivery stage rocket, information gathering means carried by said recovery stage rocket, first control means carried by said vehicle for initiating the information gathering cycle of said information gathering means at a first position over said target area, second control means carried by said vehicle, said second control means constituting altitude responsive control means operative at a predetermined altitude subsequent to the operation of said first control means to launch said recovery stage rocket along a path substantially opposite to that followed by said delivery stage rocket, recovery means carried by said recovery stage rocket, said recovery means operative to reduce the speed of said recovery stage rocket to facilitate the delivery of said information gathering means to the area of the initial launching site, and altitude responsive control means carried by said recovery stage rocket, said altitude responsive control means operative at a predetermined altitude over said initial launching site to activate said recovery means.

14. A method for obtaining aerial intelligence information of a predetermined target area from a position above said area which includes launching a two-stage rocket from an initial launching site, causing said rocket to proceed along a course to said target area, automatically activating information gathering equipment carried by the second stage of said rocket above said target area, automatically launching the second stage of said rocket from said first stage in a direction opposite to that followed by said first stage subsequent to the activation of said information gathering equipment, causing said second stage to carry the information gathering equipment along a return course to a point above the area of said initial launching site, and automatically activating a recovery unit to decrease the speed of said second stage to facilitate the recovery of said information gathering equipment.

15. A method for obtaining aerial intelligence information of a predetermined target area from a position above said area which includes launching a two-stage rocket to follow a trajectory to said target area, activating information gathering equipment carried by the second stage of said rocket at a first point above said target area, producing a thrust opposite to the direction of travel of said two-stage rocket to slow and stabilize the rocket, launching the second stage of said rocket from the first stage in a direction opposite to that followed by said first stage when the rocket reaches a predetermined altitude above said target area, causing said second stage to carry the information gathering equipment along the return trajectory to the area of said initial launching site, and automatically activating a recovery unit at a predetermined point above said initial launching site to decrease the speed of said second stage and facilitate the recovery of said information gathering equipment.

16. An aerial reconnaissance vehicle for gathering information over a designated target area and returning said information to the area of an initial launching site, comprising, a delivery stage rocket provided with a nose section and rocket propulsion means, a recovery stage rocket detachably secured to said delivery stage rocket so as to be reversely mounted relative to the direction of travel of said delivery stage rocket, the central longitudinal axis of said recovery stage rocket being positioned in substantial alignment with the central lonigtudinal axis of said delivery stage rocket, said recovery stage rocket having rocket propulsion means and laterally extending fin members secured thereto, said fin members being mounted exteriorly of said recovery stage rocket and being capable of longitudinal movement along the body thereof, information gathering means carried by said recovery stage rocket, first control means carried by said vehicle, said first control means operating to initiate the information gathering cycle of said information gathering means and to cause the ejection of the nose section of said delivery stage rocket at a first point over said target area, second control means carried by said vehicle, said second control means constituting altitude responsive control means operable at a predetermined altitude and subsequent to the operation of said first control means to activate the rocket propulsion means of said recovery stage rocket, said recovery stage rocket propulsion means operating to cause said recovery stage rocket to travel along a path substantially opposite to that followed by said delivery stage rocket, recovery means carried by said recovery stage rocket, said recovery means operative to reduce the speed of said recovery stage rocket to facilitate the delivery of said information gathering means to the area of the initial launching site, and altitude responsive control means carried by said recovery stage rocket, said altitude responsive control means operative at a predetermined altitude over said initial launching site to activate said recovery means.

17. An aerial reconnaissance vehicle for gathering information over a designated target area and returning said information to the area of an initial launching site, comprising, a delivery stage rocket, a recovery stage rocket detachably secured to said delivery stage rocket so as to be reversely mounted relative to the direction of travel of said delivery stage rocket, the central longitudinal axis of said recovery stage rocket being positioned in substantial alignment with the central longitudinal axis of said delivery stage rocket, information gathering means carried by said recovery stage rocket control means carried by said vehicle for automatically launching said recovery stage rocket over said target area to cause said recovery stage rocket to travel along a path substantially opposite to that followed by said delivery stage rocket, recovery means carried by said recovery stage rocket, said recovery means operative to reduce the speed of said recovery stage rocket to facilitate the delivery of said information gathering means to the area of the initial launching site, and recovery control means carried by said recovery stage rocket, said recovery control means operative over said initial launching site to activate said recovery means.

References Cited in the file of this patent

UNITED STATES PATENTS

| | | |
|---|---|---|
| 1,102,653 | Goddard | July 7, 1914 |
| 2,344,957 | Anzalone | Mar. 28, 1944 |
| 2,693,327 | Hild | Nov. 2, 1954 |
| 2,717,309 | Campbell | Sept. 6, 1955 |
| 2,744,700 | Jehn | May 8, 1956 |
| 2,763,447 | Carrau | Sept. 18, 1956 |
| 2,938,340 | Pion | May 31, 1960 |
| 3,015,456 | Deisinger | Jan. 2, 1962 |